(12) United States Patent
Smallwood et al.

(10) Patent No.: US 11,420,705 B2
(45) Date of Patent: Aug. 23, 2022

(54) HANDLEBAR

(71) Applicant: Cyclesport North Limited, Preston (GB)

(72) Inventors: Andrew Smallwood, Redditch (GB); Jamie Burrow, Chorley (GB)

(73) Assignee: CYCLESPORT NORTH LIMITED, Preston (GB)

(*) Notice: Subject to any disclaimer, the term of this patent is extended or adjusted under 35 U.S.C. 154(b) by 0 days.

(21) Appl. No.: 17/398,061

(22) Filed: Aug. 10, 2021

(65) Prior Publication Data

US 2022/0135174 A1    May 5, 2022

(30) Foreign Application Priority Data

Nov. 3, 2020   (EP) .................................. 20205557

(51) Int. Cl.
*B62K 21/16*   (2006.01)
*B62K 23/06*   (2006.01)

(52) U.S. Cl.
CPC .............. *B62K 21/16* (2013.01); *B62K 23/06* (2013.01)

(58) Field of Classification Search
None
See application file for complete search history.

(56) References Cited

U.S. PATENT DOCUMENTS

| | | | |
|---|---|---|---|
| 6,546,827 B2 | 4/2003 | Irie | |
| 7,908,940 B2 | 3/2011 | Naka et al. | |
| 8,056,439 B2 | 11/2011 | Fukui et al. | |
| 9,120,522 B1 | 9/2015 | Nishino | |
| 10,227,104 B2 | 3/2019 | Yang et al. | |
| 2006/0266594 A1 | 11/2006 | Tsai | |
| 2016/0339985 A1* | 11/2016 | Lund | ...................... B62K 19/36 |

(Continued)

FOREIGN PATENT DOCUMENTS

| | | |
|---|---|---|
| DE | 3900330 | 7/1990 |
| EP | 0035372 | 9/1981 |

(Continued)

OTHER PUBLICATIONS

Extended European Search Report dated Mar. 22, 2021 for related European Patent Application No. 20205557.0.

*Primary Examiner* — Vicky A Johnson
(74) *Attorney, Agent, or Firm* — Trego, Hines & Ladenheim, PLLC; Jonathan Hines

(57) ABSTRACT

A handlebar for controlling a travelling direction of a vehicle includes: a transverse support extending along a first axial direction; a first grippable element extending from a first end of the transverse support and having a free end; a cavity in the transverse support or the first grippable element, the cavity communicating with: an opening in an external surface of the transverse support or the first grippable element, and a cavity entrance in an external surface of the transverse support or the first grippable element, wherein the cavity entrance is spaced from the opening; and a mounting arrangement including a mounting plate within the cavity, the mounting plate including: a first face abutting a contact surface within the cavity and is accessible via the opening; a second face opposite to the first face and accessible via the cavity entrance; and a hole for receiving a fastener for mounting an attachment.

30 Claims, 15 Drawing Sheets

(56) References Cited

U.S. PATENT DOCUMENTS

2016/0347415 A1    12/2016  Katsura et al.
2017/0166280 A1*   6/2017  Yang ...................... B62K 23/06

FOREIGN PATENT DOCUMENTS

| EP | 1245482 | 10/2002 | | |
|---|---|---|---|---|
| EP | 2402240 | 1/2012 | | |
| FR | 2326324 | 4/1977 | | |
| WO | WO-9941138 A1 * | 8/1999 | ............. | B62K 11/14 |

* cited by examiner

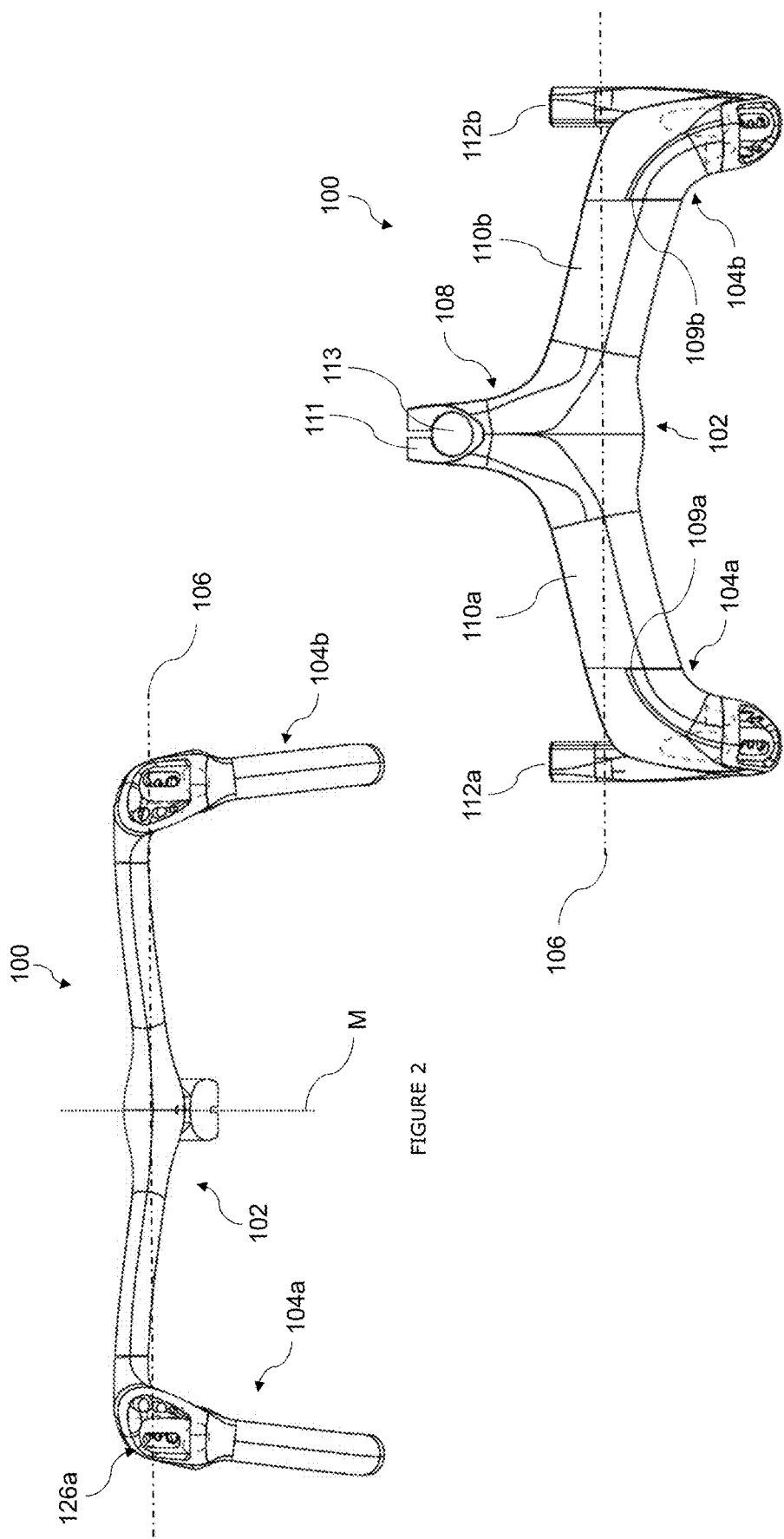

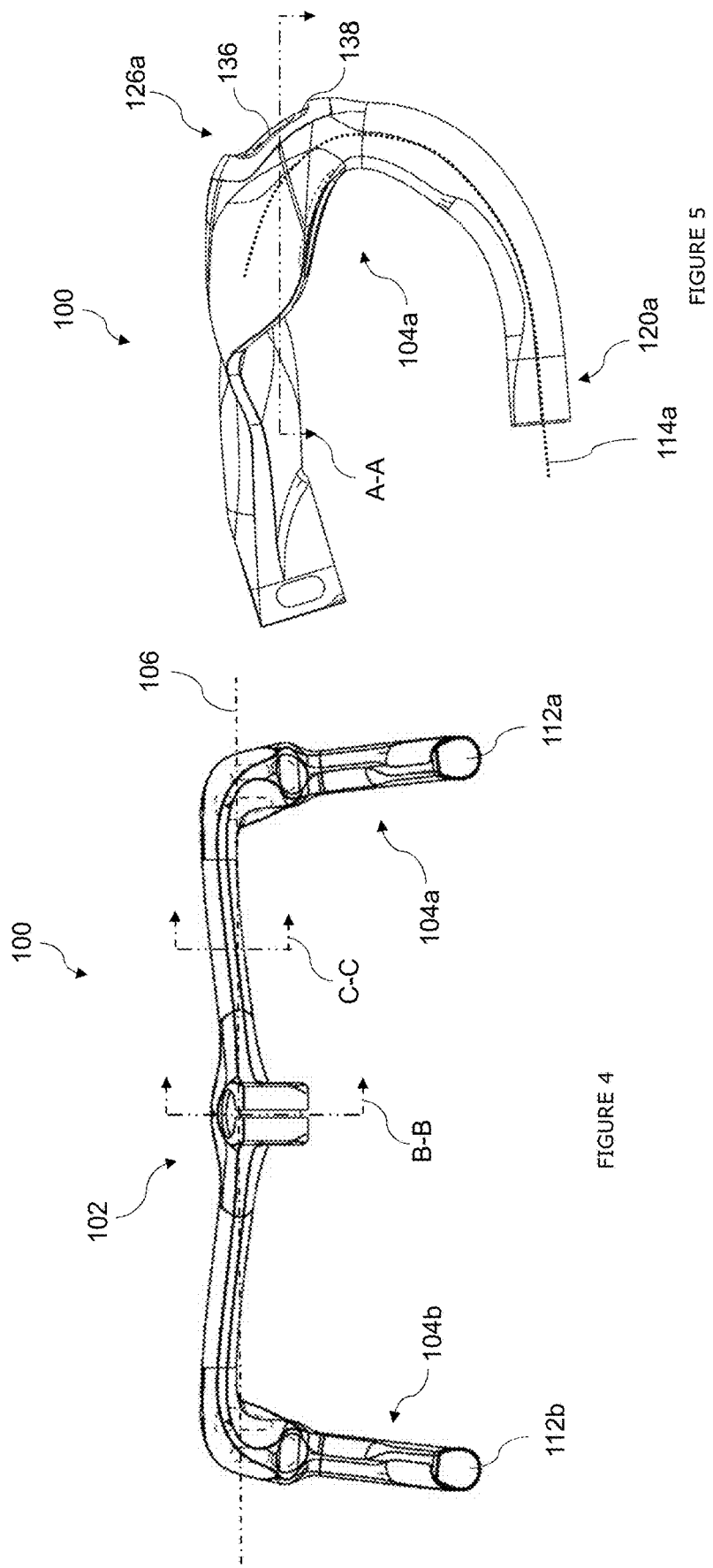

HANDLEBAR

FIELD

The present teachings relate to a handlebar for controlling a travelling direction of a vehicle.

BACKGROUND

It is known for a variety of vehicles to incorporate a handlebar, such as for example, push bicycles, motorcycles, tricycles and quadracycles. A handlebar is primarily used to control a travelling direction of the vehicle to which it is incorporated. A handlebar provides a hand position for a user that allows the user to pivot the handlebar to effect a change in vehicle travelling direction. However, it is common for a handlebar to have one or more secondary functions. For example, such secondary functions may include: providing a mounting platform for control mechanisms (e.g. brake levers, gear levers etc.) and accessories (e.g. a bell, a horn, a GPS device, a cyclocomputer etc.); and providing one or more supplementary hand positions for the user of the handlebar.

To mount an attachment to a handlebar, such as for example a brake lever mechanism, it is known to first secure the attachment to a circular clamp. To mount the attachment to the handlebar, the circular clamp is slid over a free end of the handlebar and pushed along the handlebar, away from the free end. Once the clamp is in the desired position, the clamp is secured to the handlebar, for example, by tightening the clamp to increase the friction between the clamp and the handlebar.

It is common for a handlebar to have a circular profile with a 24 mm diameter, and for the circular clamp to be sized accordingly. Handlebars known in the art require such a circular profile along at least a portion of the handlebar extending between the free end and the desired position of the attachment. Otherwise, the circular clamp may not be able to fit over the free end of the handlebar, the circular clamp may not be able to be slid along the handlebar, and/or the circular clamp may not be able to be securely attached to the handlebar.

Since known handlebars are restricted to having a circular profile along part or all of their length, the design of the shape of known handlebars is inflexible and restricted. The present invention aims to overcome or mitigate the problems associated with the prior art.

SUMMARY

According to a first aspect, there is provided a handlebar for controlling a travelling direction of a vehicle. The handlebar comprises: a transverse support for mounting to a vehicle, the transverse support extending substantially along a first axial direction; a first grippable element extending from a first end of the transverse support, the first grippable element including a free end; and a mounting arrangement for mounting an attachment to the handlebar. The mounting arrangement comprises a mounting plate arranged to at least partially abut a surface of the transverse support or the first grippable element, the mounting plate having a first face. The first face includes a hole for receiving a fastener for mounting an attachment.

Advantageously, the mounting arrangement allows an attachment to be securely mounted to the handlebar without the need to use a circular mounting bracket, as is common in the prior art. Since a circular mounting bracket is no longer required, the handlebar is not limited to having a circular profile. This allows the handlebar to have beneficial shapes, which may, for example, reduce the aerodynamic drag of the handlebar and/or improve the ergonomics of the handlebar.

The hole in the mounting plate may be a threaded hole.

The mounting plate may be at least partially located within a cavity formed in the transverse support or the first grippable element. The first face may be at least partially accessible via an opening in an external surface of the transverse support or the first grippable element.

By locating the mounting plate at least partially in a cavity, the mounting plate is less exposed to air travelling over the handlebar. Therefore, the mounting plate may have little or no effect on the aerodynamic drag of the handlebar.

The opening in the transverse support or the first grippable element may face a second axial direction substantially perpendicular to the first axial direction.

The first face may have at least one spatial dimension which is greater than at least one spatial dimension of the opening, such that the mounting plate may be prevented from passing through the opening.

An area of the first face may be greater than an area of the opening.

Advantageously, this helps to retain the mounting plate within the cavity.

The mounting plate may include a second face opposite to the first face. The second face may be accessible via a cavity entrance in the transverse support or the first grippable element. The cavity entrance may be spaced from the opening.

When attaching an attachment to the handlebar, a person may insert one or more fingers into the cavity via the cavity entrance to press the first face of the mounting plate against the opening.

The handlebar may further comprise a removable cap arranged to close the cavity entrance.

The hole in the first face may extend through the second face.

Advantageously, extending the hole through the second face allows longer fasteners to be used to mount an attachment to the handlebar, since the fastener can pass through the mounting plate.

The mounting plate may be removable from the cavity via the cavity entrance.

This allows the mounting plate to be removed for repair or for replacement.

A position of the hole relative to a perimeter of the opening may be adjustable in at least one direction.

The position of the hole relative to the perimeter of the opening may be adjustable in two perpendicular directions.

Advantageously, this allows the position of the attachment to be adjusted relative to the handlebar to suit the needs of the person using the handlebar.

A portion of the first face may be arranged to abut a contact surface of the cavity. The contact surface may be adjacent the opening. The first face and the contact surface may have corresponding curved profiles.

The first face and the contact surface may have arcuate profiles.

Advantageously, this allows adjustment which is otherwise not possible as there is no traditional clamp to adjust.

Further, this allows the orientation of an attachment mounted to the handlebar to be adjusted relative to an orientation of the handlebar. For example, when the attachment includes a brake lever, it is important to adjust the position of the brake lever so that the user can reach it with their fingers.

The external surface of the transverse support or the first grippable element comprising the opening may have a curved profile. Said external surface may have an arcuate profile.

Advantageously, this allows the orientation of an attachment mounted to the handlebar to be adjusted relative to an orientation of the handlebar.

The handlebar may further comprise a first tunnel opening and a second tunnel opening. The first tunnel opening may be adjacent the mounting arrangement. The second tunnel opening may be formed in the transverse support and be spaced from the first tunnel opening. The first tunnel opening and the second tunnel opening may be in communication with a tunnel for receiving a cable therethrough. Said tunnel may be formed within at least a portion of the transverse support.

The mounting arrangement may be located on the first grippable element. The first tunnel opening may be formed in the first grippable element.

This helps to ensure that cabling from, for example, a braking mechanism or a gear mechanism, is not exposed to air travelling over the handlebar. Therefore, advantageously, the cabling may have little or no adverse effect on the aerodynamic drag of the handlebar.

The transverse support may comprise a mounting portion for mounting to a vehicle. The second tunnel opening may be formed in or adjacent to said mounting portion.

Advantageously, this helps to ensure that cabling is not exposed to air travelling over the handlebar.

The handlebar may further comprise an attachment secured to the mounting arrangement.

The attachment may be chosen from one of: a brake mechanism; a gear shift mechanism; a combined brake and gear shift mechanism; a bell; or a cyclocomputer.

The attachment may comprise an attachment mount including a hole. A fastener may pass through the hole in the attachment mount and the hole in the mounting plate such that the attachment is secured to the mounting plate.

The mounting arrangement may be located on an attachment portion of the first grippable element. The attachment portion may have a non-circular profile in a plane normal to a longitudinal axis of the attachment portion.

Advantageously, the attachment portion may be shaped to, for example, reduce the aerodynamic drag of the attachment portion and/or to increase the comfort of a person gripping the attachment portion.

The attachment portion may have a substantially aerofoil-shaped profile in a plane parallel to a second axial direction. Said second axial direction may be substantially perpendicular to the first axial direction.

Advantageously, the aerofoil shaped profile reduces the aerodynamic drag of the attachment portion.

At least a portion of the first grippable element may have a non-circular profile in a plane normal to a longitudinal axis of the first grippable element.

Advantageously, the grippable element may be shaped to, for example, reduce the aerodynamic drag of the grippable element and/or to make the grippable element more ergonomic, i.e. increase the comfort of a person gripping the grippable element. Known handlebars do not provide these benefits. This is because known handlebars require grippable elements with circular profiles to allow attachments such as brake levers to be mounted to the handlebar.

The first grippable element may include an end portion comprising the free end. The first grippable element may have a non-circular profile in a plane normal to the longitudinal axis along said end portion.

Advantageously, the end region of the grippable element may be shaped to, for example, reduce the aerodynamic drag of the end region of the grippable element and/or to increase the comfort of a person gripping the end region of the grippable element.

At least a portion of the end portion may have a profile including at least one substantially flat side. Said profile may be in a plane normal to the longitudinal axis.

Providing at least a portion of the end portion with a flattened profile may improve the ability of a person to grip the end portion. This is because the flat side inhibits a person's hand from rotating about the end portion. Further, the flat side may provide the end portion with a truncated aerofoil shaped profile, which may reduce the aerodynamic drag of the end portion.

A majority or all of the first grippable element may have a non-circular profile in a plane normal to the longitudinal axis.

Advantageously, this allows a majority or all of the grippable element to be shaped to, for example, reduce the aerodynamic drag of the grippable element and/or to increase the comfort of a person gripping the grippable element.

The first grippable element may extend from the first end of the transverse support at a non-zero angle thereto.

This may provide a more comfortable hand position to a person gripping the grippable element.

The first grippable element may extend from the first end of the transverse support such that the longitudinal axis of the first grippable element follows a curved path.

The first grippable element may be at least partially arcuate.

This may provide multiple different gripping positions along the grippable element.

At least a portion of the first grippable element may have a substantially aerofoil-shaped profile in a plane parallel to a second axial direction. Said second axial direction may be substantially perpendicular to the first axial direction.

Advantageously, the aerofoil shaped profile reduces the aerodynamic drag of the grippable element.

The substantially aerofoil-shaped profile may have a truncated trailing edge.

Advantageously, providing the aerofoil-shaped profile with a truncated trailing edge may improve the comfort of a person gripping that portion of the handlebar. Further, truncating the trailing edge may have little or no adverse effect on the drag-reducing properties of the aerofoil-shaped profile.

The first grippable element may have a non-uniform profile in a plane normal to the longitudinal axis of the first grippable element along at least a portion of the first grippable element.

Advantageously, this may allow the grippable element to be ergonomically shaped.

At least a portion of the transverse support may have a non-circular profile in a plane normal to a longitudinal axis of the transverse support.

Advantageously, the transverse support may be shaped to, for example, reduce the aerodynamic drag of the transverse support and/or to increase the comfort of a person gripping the transverse support.

At least a portion of the transverse support may have a substantially aerofoil-shaped profile in a plane parallel to a second axial direction, said second axial direction substantially perpendicular to the first axial direction.

Advantageously, the aerofoil shaped profile reduces the aerodynamic drag of the transverse support.

The substantially aerofoil-shaped profile may have a truncated trailing edge.

Advantageously, providing the aerofoil-shaped profile with a truncated trailing edge may improve the comfort of a person gripping that portion of the handlebar. Further, truncating the trailing edge may have little or no adverse effect on the drag-reducing properties of the aerofoil-shaped profile.

The transverse support may comprise: a mounting portion for mounting to a vehicle; and a first transverse portion extending between the mounting portion and the first grippable element. The first transverse portion may have a substantially aerofoil-shaped profile
defined in a plane parallel to the second axial direction. The mounting portion may have a substantially aerofoil-shaped profile defined in a plane parallel to the second axial direction.

The substantially aerofoil-shaped profile may have a truncated trailing edge.

Advantageously, providing the aerofoil-shaped profile with a truncated trailing edge may improve the comfort of a person gripping that portion of the handlebar. Further, truncating the trailing edge may have little or no adverse effect on the drag-reducing properties of the aerofoil-shaped profile.

The first grippable element may include an ergonomic portion. The ergonomic portion may be contoured to correspond to at least a portion of a gripping hand.

Advantageously, this increases the comfort of the person gripping the grippable element.

The handlebar may further comprise a second grippable element extending from a second end of the transverse support. The second grippable element may be substantially a mirror image of the first grippable element about a plane normal to the first axial direction.

The transverse support and/or the first grippable element may be formed at least partially from carbon fiber.

The transverse support may include a mounting portion comprising a mounting structure for mounting the handlebar to a vehicle.

The mounting structure may comprise a clamp.

According to a second aspect, there is provided a vehicle comprising the handlebar according to the first aspect.

The vehicle may be one of: a bicycle; a tricycle; or a quadracycle.

BRIEF DESCRIPTION OF THE DRAWINGS

Embodiments are now disclosed by way of example only with reference to the drawings, in which:

FIG. 2 is a front view of the handlebar according to the embodiment;

FIG. 3 is a top view of the handlebar shown in FIG. 2;

FIG. 4 is a rear view of the handlebar shown in FIG. 2;

FIG. 5 is a side view of the handlebar shown in FIG. 2;

DETAILED DESCRIPTION OF EMBODIMENT(S)

A handlebar 100 is used for controlling a travelling direction of a vehicle, such as a push bicycle, a motorcycle, a tricycle, or a quadracycle.

Figure 1:
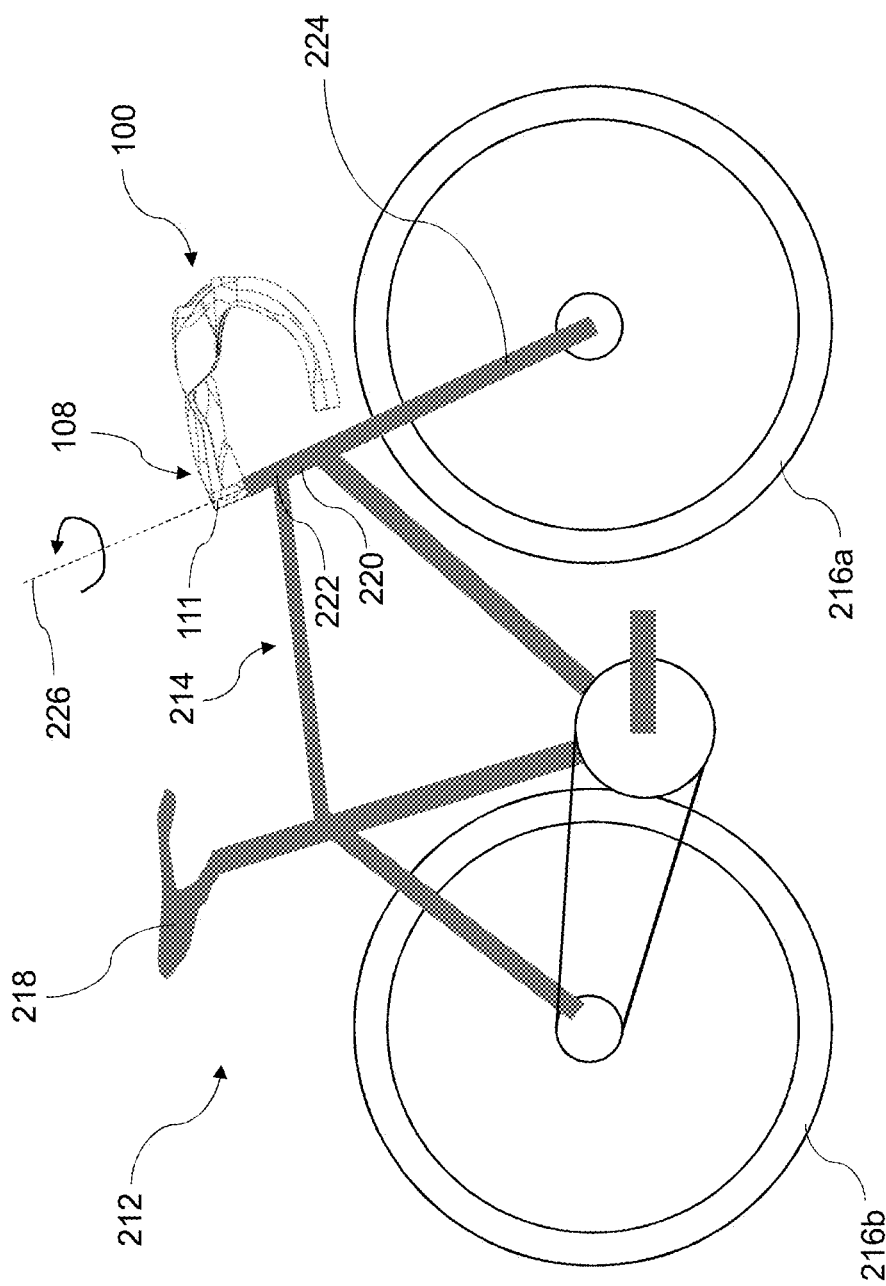
FIG. 1 is a side view of a bicycle comprising a handlebar according to an embodiment.

FIG. 1 shows an example where the vehicle comprising the handlebar 100 is a push bicycle 212. The push bicycle 212 includes the handlebar 100, a frame 214, a front wheel 216a, a rear wheel 216b and a seat 218.

In alternative embodiments (not shown), the vehicle may be a motorcycle, a tricycle (motorized or non-motorized), or a quadracycle (motorized or non-motorized). A quadracycle includes any four-wheeled vehicle. The vehicle may include more than four wheels.

With reference to FIGS. 2 to 6, the handlebar 100 includes a transverse support 102, a first grippable element 104a and a second grippable element 104b. The first grippable element 104a includes a first free end 112a, and the second grippable element 104b includes a second free end 112b.

In the illustrated embodiment, the transverse support 102, the first grippable element 104a and the second grippable element 104b are formed at least partially from carbon fiber. However, in alternative embodiments (not shown), one or more of the transverse support 102, the first grippable element 104a and the second grippable element 104b may be formed from any alternative suitable material, such as alloys of aluminum, titanium or steel for example.

The grippable elements 104a, 104b are each for receiving a gripping hand of a user of the handlebar 100. The transverse support 102 supports the grippable elements 104a, 104b, and provides moment arms for pivoting the handlebar 100 via the grippable elements 104a, 104b. The transverse support 102 may also be suitable for receiving a gripping hand.

The transverse support 102 includes a mounting portion 108, an elongate first transverse portion 110a and an elongate second transverse portion 110b. The first grippable element 104a extends from a first end 109a of the transverse support 102, i.e. from an end of the first transverse portion 110a furthest from the mounting portion 108. Likewise, the second grippable element 104b extends from a second end 109b of the transverse support 102, i.e. from an end of the second transverse portion 110b furthest from the mounting portion 108. As such, the first transverse portion 110a extends between the mounting portion 108 and the first grippable element 104a, and the second transverse portion 110b extends between the mounting portion 108 and the second grippable element 104b.

The mounting portion 108 includes a mounting structure for mounting the handlebar 100 to the bicycle 212. In the illustrated embodiment, the mounting structure is a clamp 111 including a circular aperture 113. A portion of a steering tube 220 is received within the aperture 113 of the clamp 111, and is secured in place using fasteners (not shown).

The steering tube 220 passes through a head tube 222, which is part of the frame 214 of the bicycle 212, and a fork 224 extends from the steering tube 220. The front wheel 216a is mounted to the fork 224, as is known in the art. The head tube 222 includes a head set with bearings that allow for pivoting of the handlebar 100 about an axis 226 causing the fork 224 to pivot about the axis 226 with respect to the frame 214.

The handlebar 100 is mounted to the bicycle 212 such that pivoting of the handlebar 100 about an axis 226 causes the fork 224 to pivot about the axis 226 with respect to the frame 214. Pivoting of the fork 224 about the axis 226 causes the front wheel 216a to pivot about the axis 226. As such, pivoting of the handlebar 100 about the axis 226 allows a user of the bicycle 212 to change the travelling direction of the bicycle 212 when the bicycle 212 is moving.

The transverse support 102 extends substantially along a first axial direction 106 (represented by a dot-dash line in FIGS. 2 to 4 and 6). In the illustrated embodiment, the transverse support 102 does not extend parallel to the first axial direction 106. Instead, the first transverse portion 110a and the second transverse portion 110b extend away from the mounting portion 108 at an acute angle relative to the first axial direction 106. As such, the transverse support 102 has a substantially chevron-shaped profile when viewed as shown in FIG. 3.

Advantageously, providing the transverse support 102 with a chevron-shaped profile increases the stiffness of the transverse support 102. Further, since the first and second transverse portions 110a, 110b extend away from the mounting portion 108 at an acute angle relative to the first axial direction 106, the mounting portion 108 has a smaller length as measured perpendicular to the first axial direction 106 relative to if the transverse support 102 was straight. This is because the first and second transverse portions 110a, 110b space the grippable element 104a, 104b from the steering tube 220 to provide a comfortable riding position, instead of the mounting portion 108.

In alternative embodiments (not shown), the transverse support 102 may extend parallel to the first axial direction 106, i.e. the transverse support 102 may be substantially straight. Alternatively, the transverse support 102 may have any suitable non-straight and non-chevron shape.

Figure 6:
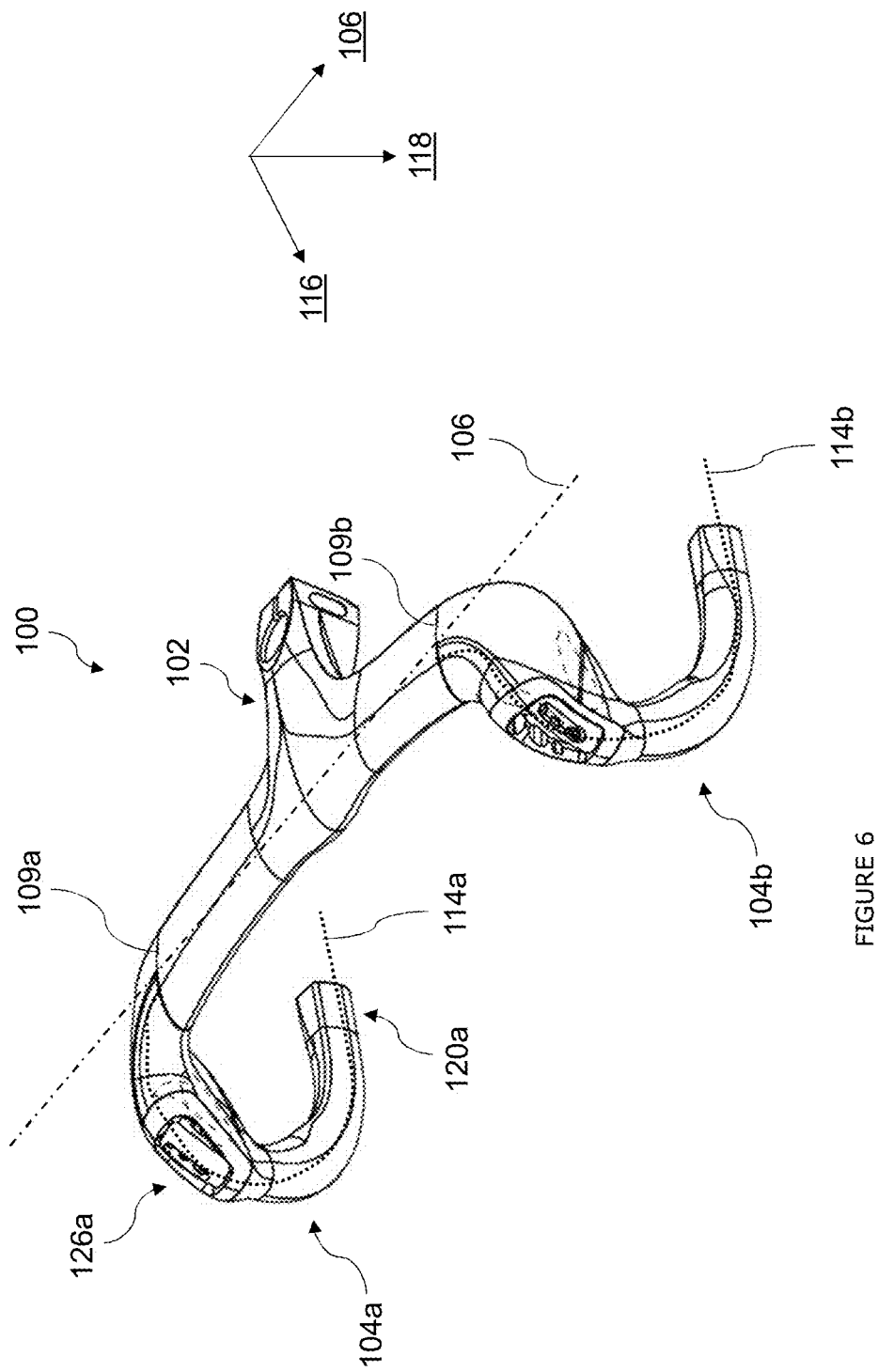
FIG. 6 is an isometric view of the handlebar shown in FIG. 2.

With reference to FIGS. 5 and 6, the first grippable element 104a extends from the transverse support 102 along a first longitudinal axis 114a, and the second grippable element 104b extends from the transverse support 102 along a second longitudinal axis 114b. The first and second longitudinal axes 114a, 114b (represented as dotted lines in FIGS. 5 and 6) extend centrally through the first and second grippable elements 104a, 104b respectively.

The first grippable element 104a extends from the first end 109a of the transverse support 102 at a non-zero angle thereto; i.e. the first longitudinal axis 114a extends from a central axis (not shown) of the first transverse portion 110a at a non-zero angle. Likewise, the 10 second grippable element 104a extends from the second end 109b of the transverse support 102 at a non-zero angle thereto. As such, the handlebar 100 is not a straight handlebar.

As shown in FIG. 6, the first grippable element 104a extends from the first end 109a of the transverse support 102 such that the first longitudinal axis 114a follows a curved path. Likewise, the second grippable element 104b extends from the second end 109b of the transverse support 102 such that the second longitudinal axis 114b follows a curved path.

In particular, the first longitudinal axis 114a extends from the first end 109a at a non-zero angle to a central axis (not shown) of the first transverse portion 110a, curves around to travel substantially along a second axial direction 116, curves around to travel substantially along a third axial direction 118, and finally curves around to travel substantially along the second axial direction 116 in reverse. Likewise, the second longitudinal axis 114b follows a substantially similar curved path. The first 106, second 116 and third 118 axial directions are all mutually perpendicular.

The first and second longitudinal axes 114a, 114b and therefore the first and second grippable elements 104a, 104b, are partially arcuate; see, for example, FIGS. 5 and 6. In the illustrated embodiment, the handlebar 100 is a drop handlebar, as found on road bicycles for example.

In alternative embodiments (not shown), the first and second longitudinal axes 114a, 114b may follow any suitable path. For example, the grippable elements 104a, 104b may extend 30 from the transverse support 102 such that they are substantially parallel to the respective first and second transverse portions 110a, 110b; e.g. the handlebar 100 may be a flat handlebar, as found on mountain bicycles for example. Alternatively, the grippable elements 104a, 104b and the transverse support 102 may be shaped such that the handlebar 100 is any one of: a bullhorn handlebar; a BMX style handlebar; a triathlon style handlebar; an upright/North Road handlebar; a moustache handlebar; an ape hanger handlebar; and a recumbent handlebar.

Of the two grippable elements 104a, 104b, only the first grippable element 104a will be discussed further in the following. Likewise, of the two transverse portions 110a, 110b, only the first transverse portion 110a will be discussed further in the following. However, it should be noted that the second grippable element 104b and the second transverse portion 110b may include any of the features described below in relation to the first grippable element 104a and the first transverse portion 110a respectively.

The first grippable element 104a has a non-circular profile in a plane normal to the first longitudinal axis 114a. In particular, all of the first grippable element 104a has a non-circular profile in a plane normal to the first longitudinal axis; i.e. the first grippable element 104a has a non-circular profile along the entire first longitudinal axis 114a in planes normal to the first longitudinal axis 114a.

The first grippable element 104a includes a first end portion 120a which includes the first free end 112a. The first grippable element 104a has a non-circular profile in a plane normal to the first longitudinal axis 114a along the first end portion 120a.

Figure 7:
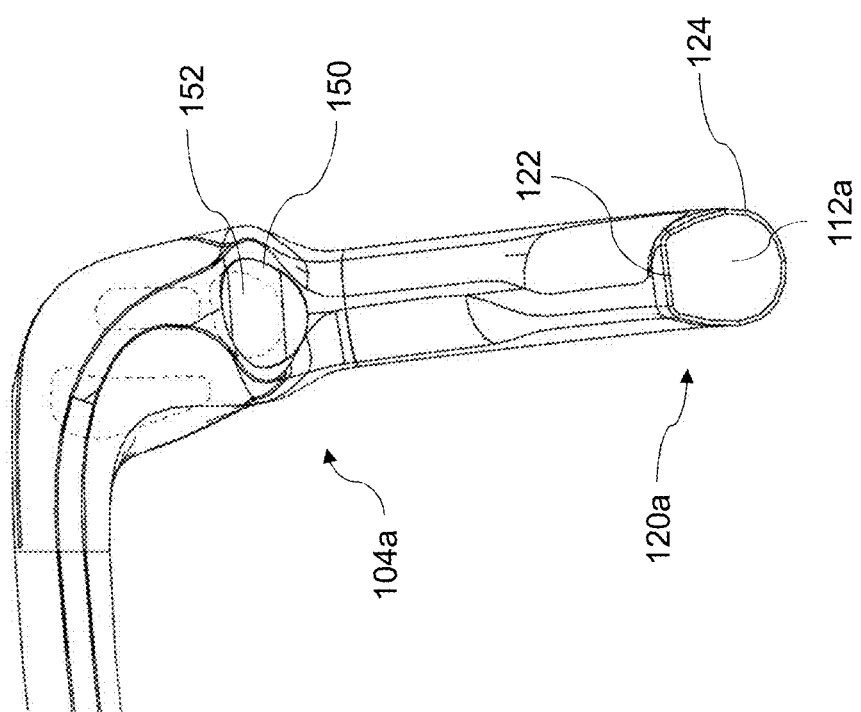
FIG. 7 is a magnified rear view of a grippable element according to the embodiment.

As shown most clearly in FIG. 7, the non-circular profile of the first end portion 120a includes a substantially flat side 122. A curved edge 124 joins the two ends of the flat side 122 to complete the profile of the first end portion 120a. The flat side 122 faces substantially in the direction opposite to the third axial direction 118 and generally faces the transverse support 102.

In alternative embodiments (not shown), the first end portion 120a may have any suitable non-circular profile including one or more flat sides 122. For example, the non-circular profile of the first end portion 120a may be polygonal.

In alternative embodiments (not shown), the first grippable element 104a may not have a non-circular profile along the entire first longitudinal axis 114a in planes normal to the first longitudinal axis 114a. For example, the first end portion 120a may have a circular profile in a plane normal to the first longitudinal axis 114a along at least part of the first end portion 120a. In such embodiments, one or more portions of the first grippable element 104a spaced from or adjacent to the first end portion 120a will have a non-circular profile in a plane normal to the first longitudinal axis 114a. Alternatively, only the first end portion 120a may have a non-circular profile in a plane normal to the first longitudinal axis 114a.

The first grippable element 104a has a non-uniform profile in a plane normal to the first longitudinal axis 114a along at least a portion of the first grippable element 104a. By this it is meant that at least a portion of the first grippable element 104a includes profiles in two spaced-apart planes which are both normal to the first longitudinal axis 114a, where the profile of the first grippable element 104a in a first of the two planes is different to the profile of the first grippable element 104a in a second of the two planes in regard to size and/or shape.

However, in alternative embodiments (not shown), the first grippable element 104a may have a uniform profile in a plane normal the first longitudinal axis 114a along its length.

The transverse support 102 has a non-circular profile in a plane normal to a longitudinal axis running centrally through the transverse support 102. In the illustrated embodiment, the first transverse portion 110a, the second transverse portion 110b and the mounting portion 108 all have a non-circular profile in a plane normal to the longitudinal axis running centrally through the transverse support 102. However, in alternative embodiments (not shown), only a portion or portions of the first transverse portion 110a, the second transverse portion 110b and/or the mounting portion 108 may have a non-circular profile in a plane normal to the longitudinal axis running centrally through the transverse support 102. In further alternative embodiments (not shown), the first transverse portion 110a, the second transverse portion 110b and/or the mounting portion 108 may have a circular profile in a plane normal to a longitudinal axis running centrally through the transverse support 102.

Since at least a portion of the first grippable element 104a has a non-circular profile, prior art circular clamps may be unsuitable for mounting attachments (e.g. a brake lever mechanism) to the first grippable element 104a. For example, a prior art circular clamp may be unable to slide over a portion of the first grippable element 104a (e.g. the first free end 112a), and therefore a prior art circular clamp may be unable to be slid along the first grippable element 104a to its desired position. Further, even if a prior art circular clamp is able to be slid into a desired position, the non-circular profile of the first grippable element 104a at said desired position may inhibit the circular clamp from making sufficient contact with an external surface of the first grippable element 104a, such that the attachment cannot be securely mounted.

Likewise, since at least a portion of the transverse support 102 may have a non-circular profile, prior art circular clamps may be unsuitable for mounting attachments (e.g. a brake lever mechanism) to the transverse support 102 for similar reasons as above.

To overcome these problems, the handlebar 100 includes a first mounting arrangement 126a for mounting an attachment to the handlebar 100. For example, the attachment could be: a brake mechanism; a gear shift mechanism; a combined brake and gear shift mechanism; a bell; or a cyclocomputer. In the illustrated embodiment, an attachment portion 125a of the first grippable element 104a includes the first mounting arrangement 126a.

With reference to FIGS. 8 to 14, the first mounting arrangement 126a includes a mounting plate 128 which is arranged to at least partially abut a surface of the first grippable element 104a. The mounting plate 128 includes a first face 130, which includes a hole 132 for receiving a fastener for mounting an attachment.

In the illustrated embodiment, the hole 132 is a threaded hole. However, in alternative embodiments (not shown), the hole 132 may be unthreaded.

In the illustrated embodiment, the mounting plate 128 is formed from a metallic material. However, in alternative embodiments (not shown), the mounting plate 128 may be formed from any suitable material, such as for example, a stiff polymeric material.

The mounting plate 128 is at least partially located within a cavity 134 formed in the first grippable element 104a. The first face 130 is at least partially accessible via an opening 136 in an external surface 138 of the first grippable element 104a.

The first face 130 of the mounting plate 128 has a width 140 and a length 142. In the illustrated embodiment, the length 142 is greater than the width 140. However, in alternative embodiments (not illustrated), the width 140 of the first face 130 may be substantially equal to the length 142 of the first face 130.

The opening 136 has a width 144 and a length 146. In the illustrated embodiment, the length 146 is greater than the width 144. However, in alternative embodiments (not illustrated), the width 144 of the opening 136 may be substantially equal to the length 146 of the opening 136.

The width 140 and the length 142 of the first face 130 are greater than the width 144 and the length 146 of the opening 136 respectively; i.e. the area of the first face 130 is greater than the area of the opening 136. As such, the mounting plate 128 is prevented from passing through the opening 136 when the mounting plate 128 is orientated such that the first face 130 faces the opening 136. In some orientations, the mounting plate 128 may be able to pass through the opening 136 if the width 140 of the first face 130 is less than the length 146 of the opening 136, and the depth of the mounting plate 128 is less than the width 144 of the opening 136.

In alternative embodiments (not shown), the width 140 or the length 142 of the first face 130 may be less than or equal to the width 144 or the length 146 of the opening 136 respectively. In such embodiments, the mounting plate 128 may still be prevented from passing through the opening 136 when the mounting plate 128 is orientated such that the first face 130 faces the opening 136 since either the width 140 or the length 142 of the first face 130 is greater than the width 144 or the length 146 of the opening 136 respectively.

The mounting plate 128 includes a second face 148 which is opposite to the first face 130. The second face 148 is accessible via a cavity entrance 150 in the first grippable element 104a. In the illustrated embodiment, the hole 132 in the first face 130 of the mounting plate 128 extends through the second face 148.

The cavity entrance 150 is spaced from the opening 136. In the illustrated embodiment, the cavity entrance 150 is located substantially on an opposite side of the first grippable element 104a to the opening 136. The cavity entrance 150 is sized relative to the mounting plate 128 such that the mounting plate 128 is removable from the cavity 134 via the cavity entrance 150.

Figure 14:
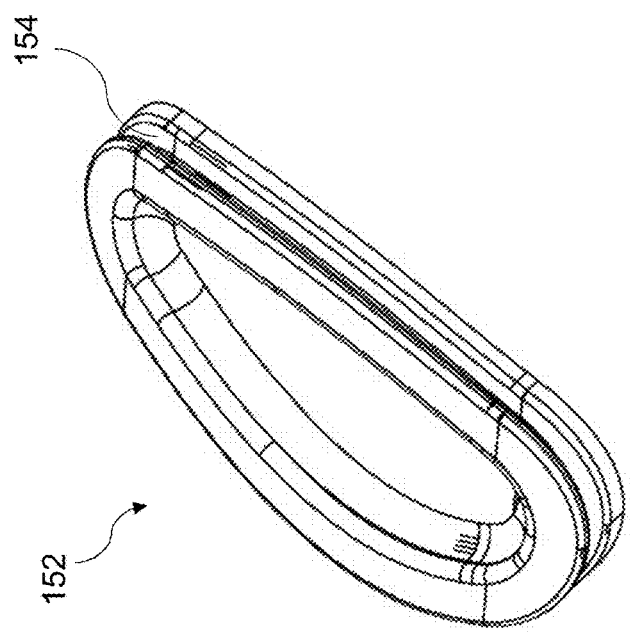
FIG. 14 is an isometric view of a removable cap according to the embodiment.

The cavity entrance 150 is closed via a removable cap 152 (shown in isolation in FIG. 14). The removable cap 152 has a profile shaped to correspond to the cavity entrance 150 and is formed from a flexible material (e.g. a flexible polymeric material such as rubber). The removable cap 152 includes a channel 154 extending around a periphery of the removable cap 152. The cavity entrance 150 is closed by pressing a portion of the removable cap 152 into the cavity 134 via the cavity entrance 150, until a wall surrounding the cavity entrance 150 is received in the channel 154. The removable cap 152 is removed via a reversal of this process.

A portion of the first face 130 of the mounting plate 128 is arranged to abut a contact surface 160 of the cavity 134. The contact surface 160 is adjacent to and surrounds the opening 136. The first face 130 and the contact surface 160 have corresponding curved profiles.

Figure 11:
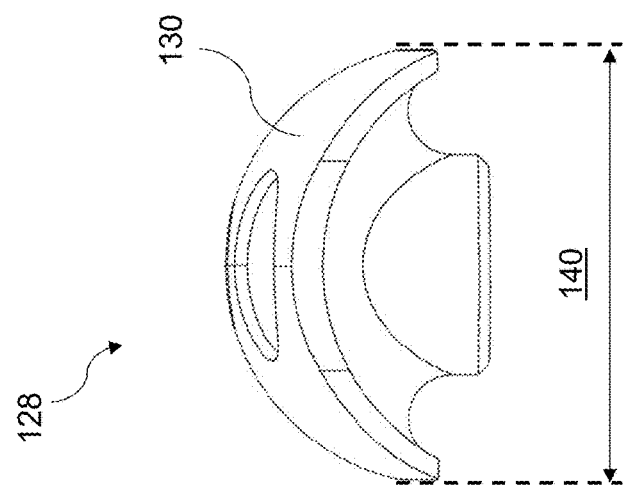
FIG. 11 is a first side view of the mounting plate shown in FIG. 10.
Figure 10:
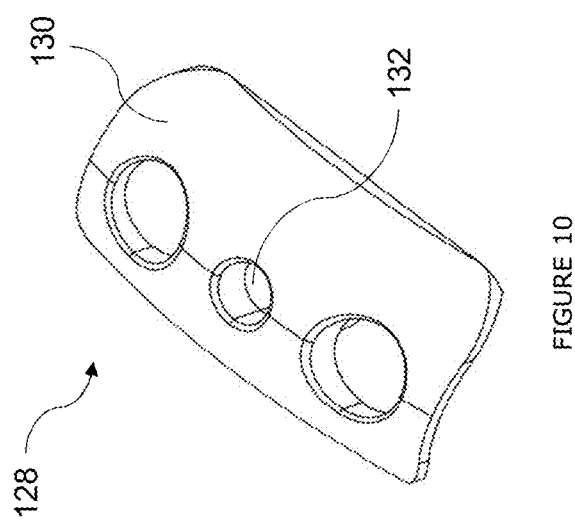
FIG. 10 is a front isometric view of a mounting plate according to the embodiment.
Figure 13:
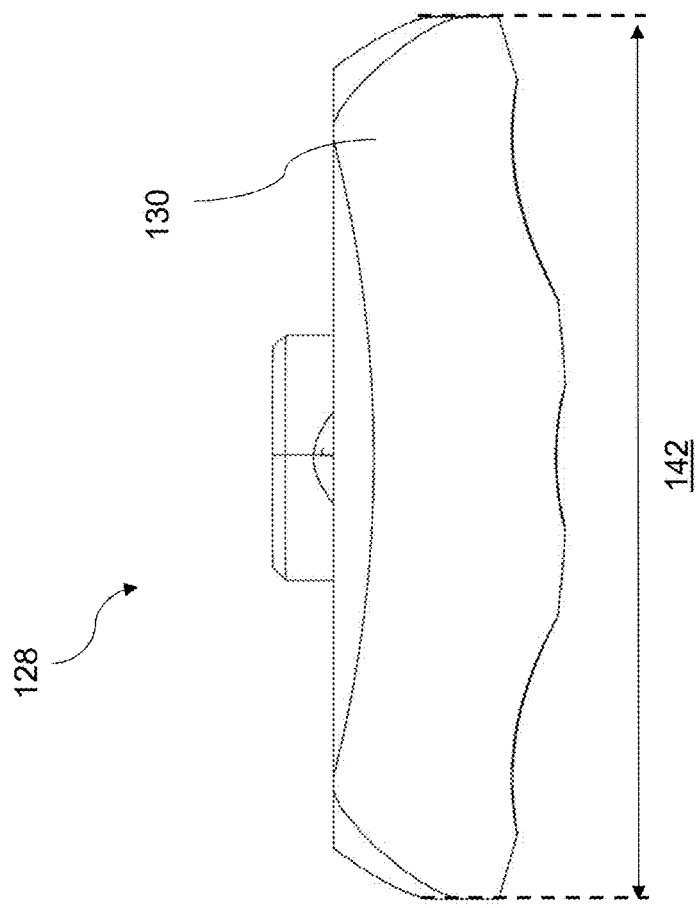
FIG. 13 is a second side view of the mounting plate shown in FIG. 10.

In the illustrated embodiment, the first face 130 and the contact surface 160 have corresponding arcuate profiles. As shown in FIG. 11, the first face 130 has an arcuate profile along its length 142. As shown in FIG. 13, the first face 130 also has an arcuate profile along its width 140.

The corresponding curved profiles of the contact surface 160 and the first face 130 allow the position and the orientation of the hole 132 to be adjusted relative to a perimeter of the opening 136 by sliding a portion of the first face 130 over the contact surface 160, whilst maintaining contact between the contact surface 160 and said portion of the first face 130. The position of the hole 132 relative to the perimeter of the opening 136 is adjustable in two perpendicular axial directions 156, 158. The orientation of the hole 132 (i.e. the orientation of an axis extending centrally through the hole 132) relative to the perimeter of the opening 136 is adjustable about the two axial directions 156, 158.

Advantageously, since the position and the orientation of the hole 132 may be adjusted relative to the perimeter of the opening 136, the position and the orientation of an attachment secured to the mounting plate 128 is adjustable relative to the perimeter of the opening 136. This may allow an attachment mounted to the handlebar 100 via the mounting arrangement 126a, such as a brake and/or gear lever for example, to be adjusted such that it can be more comfortably reached by a hand gripping the handlebar 100.

In alternative embodiments (not shown), the position and/or orientation of the hole 132 relative to the perimeter of the opening 136 may be adjustable in one direction only. For example, the cavity 134 may be configured such that the mounting plate 128 is restricted from moving along or about one of the axial directions 156, 158.

Figure 8:
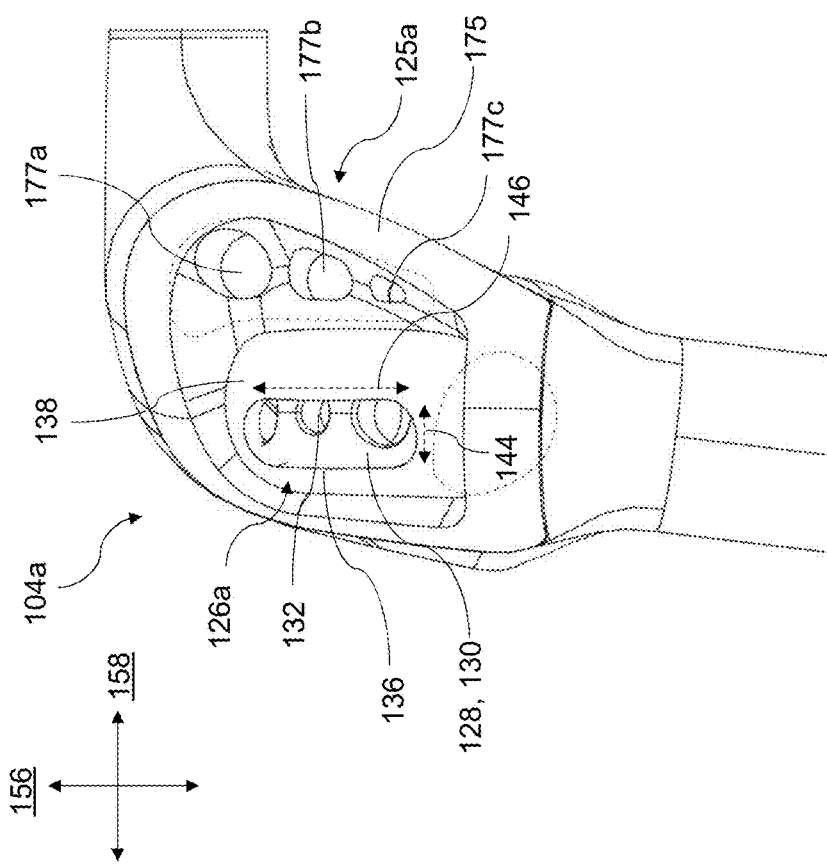
FIG. 8 is a front magnified view of a mounting arrangement according to the embodiment.
Figure 12:
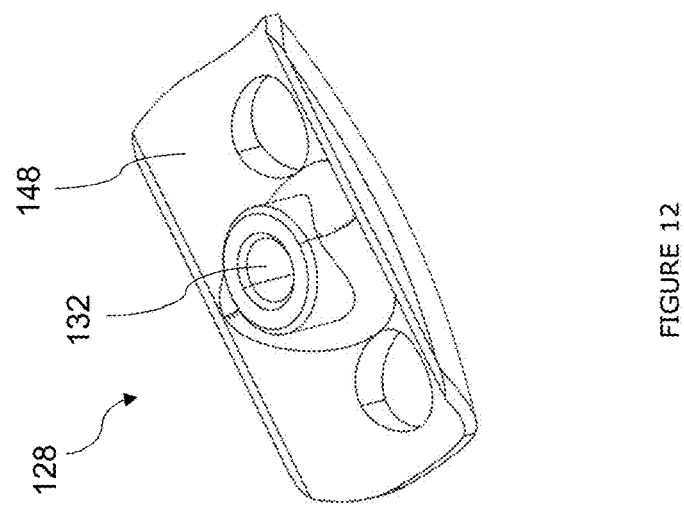
FIG. 12 is a rear isometric view of the mounting plate shown in FIG. 10.

The external surface 138 of the first grippable element 104a that includes the opening 136 has a curved profile. In particular, the external surface 138 has an arcuate profile along the axial direction 156 (as illustrated in FIG. 8), and along the axial direction 158 (as illustrated in FIG. 5). In the illustrated embodiment, the curved profile of the external surface 138 substantially corresponds to the curved profile of the contact surface 160.

As demonstrated in the example below, some attachments may include an attachment mount or other supporting structure, which is arranged to abut the external surface 138 when mounted to the mounting arrangement 126a. Therefore, the curved profile of the external surface 138 allows the orientation of the attachment to be adjusted relative to an orientation of the handlebar 100, whilst ensuring consistent contact between the attachment supporting structure and the external surface 138.

Figure 15:
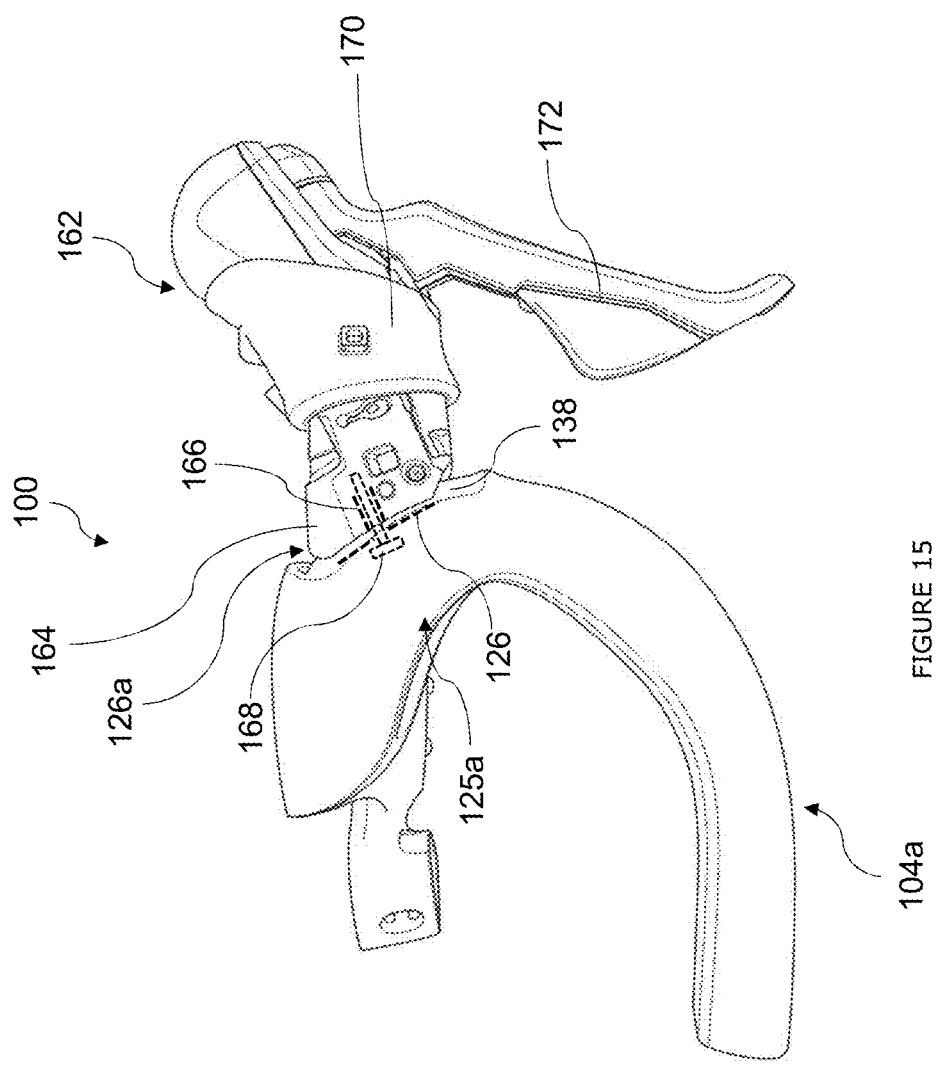
FIG. 15 is a first side view of an attachment secured to the mounting arrangement shown in FIGS. 8 and 9 with its skirt in a retracted position.
Figure 16:
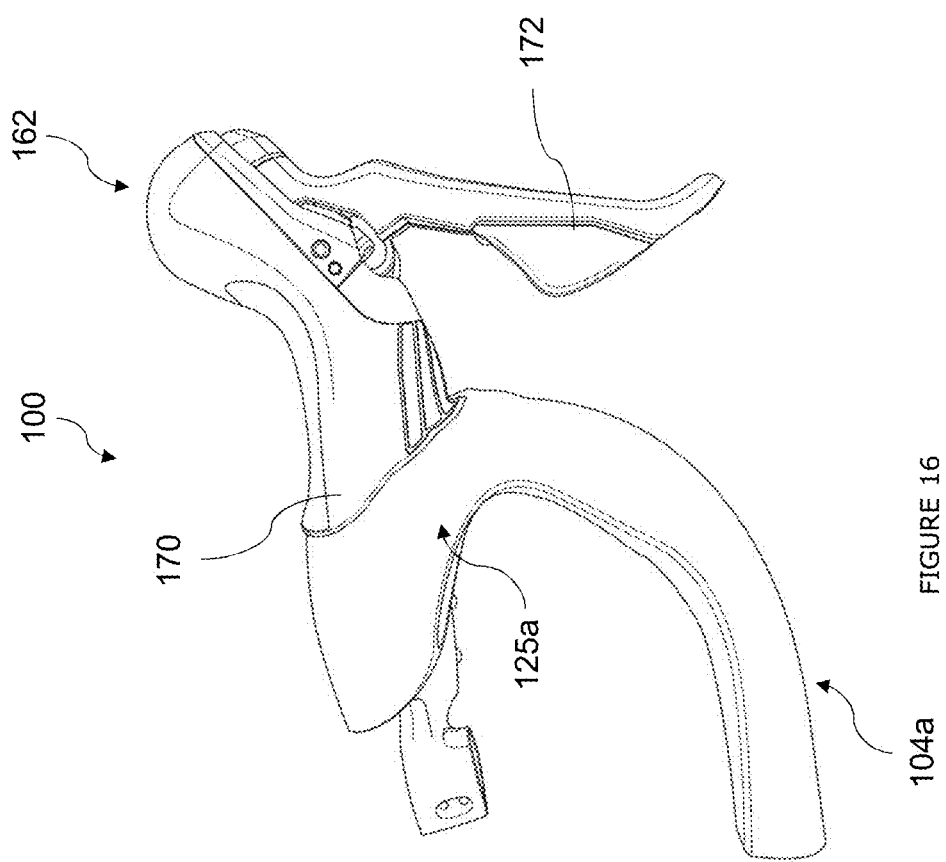
FIG. 16 is a first side view of the attachment shown in FIG. 15 with its skirt in an extended position.
Figure 17:
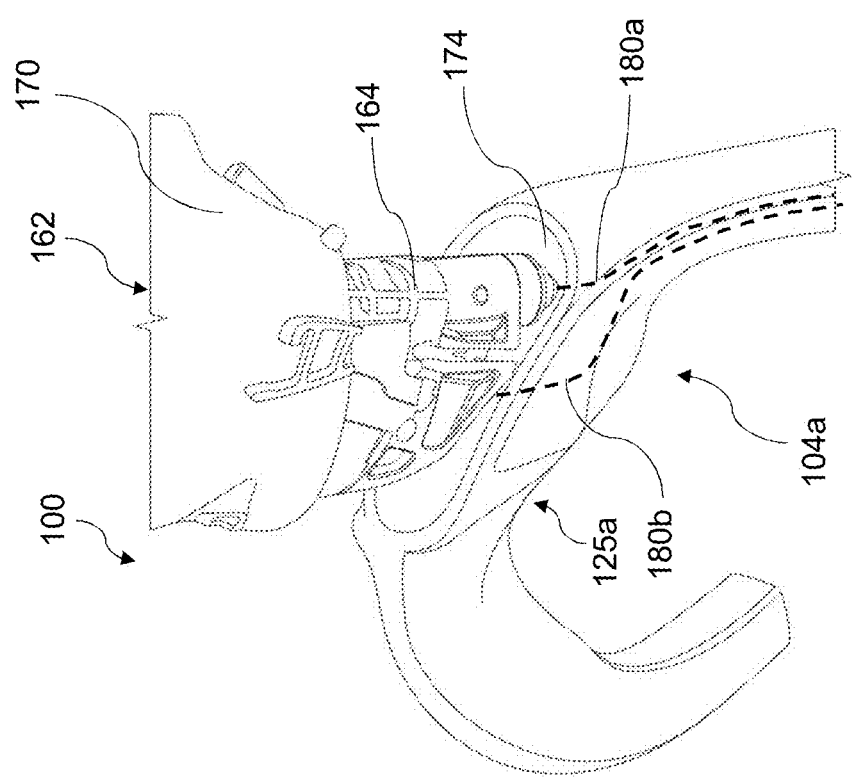
FIG. 17 is an isometric second side view of the attachment shown in FIG. 15.
Figure 18:
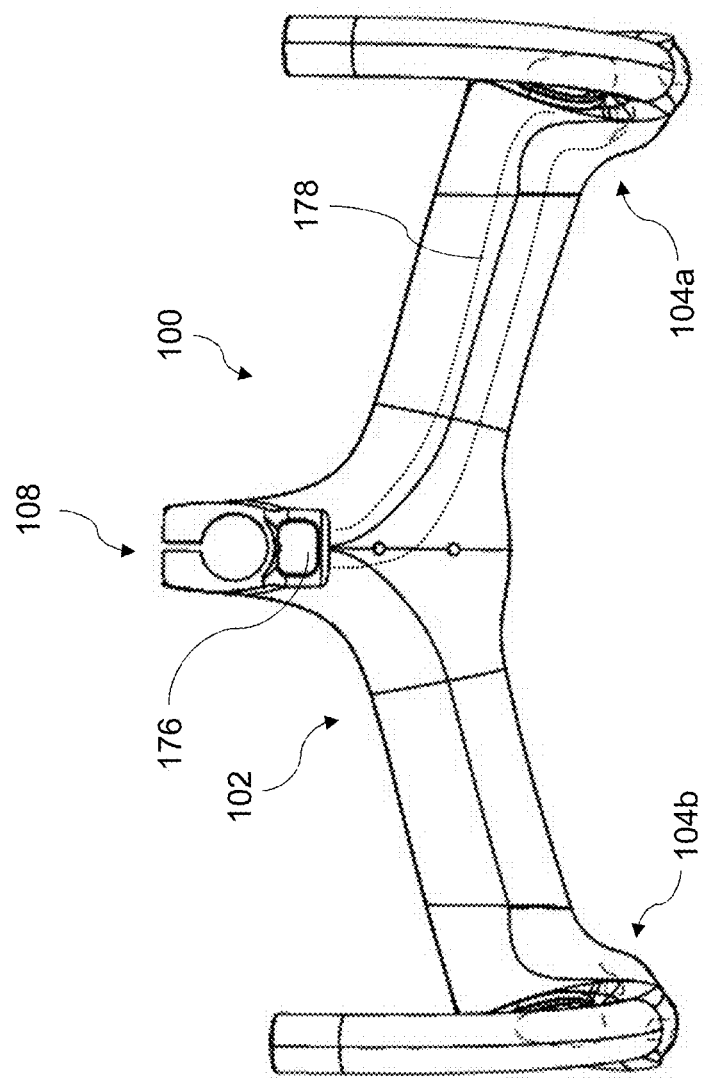
FIG. 18 is a lower view of the handlebar shown in FIG. 2.

With reference to FIGS. 15 to 17, an attachment 162 is secured to the first mounting arrangement 126a. In particular, the attachment 162 is a combined brake and gear shift mechanism, and the attachment 162 is mounted to the first grippable element 104a of the handlebar 100.

The attachment 162 includes an attachment mount 164 and a lever 172. An abutment surface (not shown) of the attachment mount 164 includes a hole 166 (shown in phantom in FIG. 15). In the illustrated embodiment, the hole 166 is a threaded hole.

To secure the attachment 162 to the first mounting arrangement 126a, the abutment surface of the attachment mount 164 is placed against the external surface 138. In the illustrated embodiment, the abutment surface has a curved profile corresponding to the curved profile of the external surface 138. As such, the position and orientation of the attachment mount 164 relative to the perimeter of the opening 136 can be adjusted whilst ensuring contact is maintained between the abutment surface and the external surface 138.

Once the attachment mount 164 is in a desired position relative to the perimeter of the opening 136, the mounting plate 128 is positioned within the cavity 134 such that the first face 130 faces the opening 136 and the hole 132 in the mounting plate 128 is coincident with the hole 166 in the attachment mount 164. This can be achieved by a user inserting one or more fingers into the cavity 134 via the cavity entrance 150 to manipulate the mounting plate 128.

A fastener 168 (shown in phantom in FIG. 15) is then introduced into the cavity 134 via the cavity entrance 150 and inserted through the hole 132 from the second face 148 of the mounting plate 128 (shown in phantom in FIG. 15). In the illustrated embodiment, the fastener 168 is a threaded fastener, which is screwed into the threaded hole 132. The fastener 168 passes through the hole 132 into the mounting plate 128 until a distal end of the fastener 168 extends away from the first face 130 of the mounting plate, through the opening 136 and into the hole 166 in the attachment mount 164. The fastener 168 is screwed into the hole 166 in the attachment mount 164 until the attachment mount 164 is fixedly secured to the first mounting arrangement 126a.

The attachment 162 includes a skirt 170, which is formed from a flexible material (e.g. a flexible polymeric material such as rubber). The skirt 170 is in a retracted position in FIG. 15. Once the attachment 162 has been secured to the first mounting arrangement 126a as described, the skirt 170 is extended over the attachment mount 164 such that it covers the first mounting arrangement 126a, as shown in FIG. 16. The skirt 170 inhibits air flowing over the handlebar 100 from contacting the first mounting arrangement 126a or the attachment mount 164, and provides a smooth continuous surface for air to flow over. As such, the skirt 170 acts to reduce the aerodynamic drag of the handlebar 100.

As shown in FIG. 6, the opening 136 of the first mounting arrangement 126a generally faces the second axial direction 116. As such, the attachment 162 mounted to the first mounting arrangement 126a generally faces the second axial direction 116. As such, the attachment 162 may be located proximate one or more fingers of a user's hand which is gripping the first grippable element 104a. For example, one or more fingers of a user's hand may be able to actuate the lever 172.

However, in alternative embodiments (not shown), the opening 136 may face in any suitable direction. In alternative embodiments (not shown), the transverse support 102 (e.g. the first transverse portion 110a or the mounting portion 108) may include the first mounting arrangement 126a. In such embodiments, the mounting plate 128 is arranged to at least partially abut a surface of the transverse support 102. The mounting plate 128 may at least partially be located within a cavity formed in the transverse support 102. The first face 130 of the mounting plate 128 may at least partially be accessible via an opening in an external surface of the transverse support 102. In such embodiments, the first mounting arrangement may share any of the features described regarding the first mounting arrangement 126a located on the first grippable element 104a.

Some attachments may require cabling to extend between the attachment and part of the bicycle 212 to which the handlebar 100 is mounted. For example, if the attachment is a 10 brake lever mechanism, it is common for brake cabling to extend between the brake lever mechanism and a brake mechanism, which is usually proximate one or both of the wheels 216a, 216b of the bicycle 212. It is also common for such cabling to run external to the handlebar 100, and as such, be exposed to oncoming air flow when the bicycle 212 is travelling. Exposed attachment cabling may increase the aerodynamic drag of the handlebar 100, and may also harm the aesthetic appearance of the handlebar 100.

To overcome these problems, the handlebar 100 is configured to minimize the amount of attachment cabling that is exposed.

With reference to FIGS. 8, 9, 17 and 18, the handlebar 100 includes a first tunnel opening 174 adjacent the first mounting arrangement 126a, and a second tunnel opening 176 in the transverse support 102 and spaced from the first tunnel opening 174. In the illustrated embodiment, the first tunnel opening 174 is formed in the first grippable element 104a, and the second tunnel opening 176 is formed in the mounting portion 108.

In FIG. 8, a frame 175 is secured to the first grippable element 104a, and is arranged to surround the external surface 138. The frame 175 includes three apertures 177a, 177b, 25 177c adjacent to the first tunnel opening 174. Cabling may extend through the apertures 177a, 177b, 177c into the first tunnel opening 174.

Figure 9:
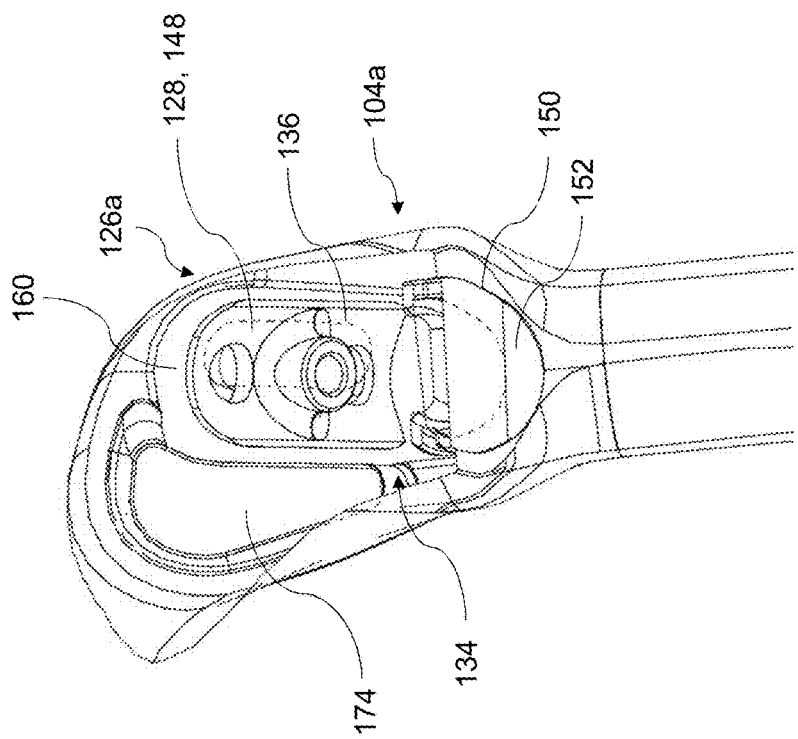
FIG. 9 is a rear cross-sectional view of the mounting arrangement shown in FIG. 8.

As shown in FIG. 9, the first tunnel opening 174 is formed as a single aperture adjacent to the contact surface 160. In FIG. 9, the frame 175 has been removed for clarity.

The first tunnel opening 174 and the second tunnel opening 176 are in communication with a tunnel 178 (represented by dashed lines in FIG. 18) for receiving one or more cables therethrough. In the illustrated embodiment, the tunnel 178 is formed within the transverse support 102 and the first grippable element 104a, and extends between the first tunnel opening 174 and the second tunnel opening 176.

As shown in FIG. 17, a first cable 180a and a second cable 180b extend from the attachment 162 into the first tunnel opening 174. The first cable 180a is for controlling a braking mechanism (not shown), and the second cable 180b is for controlling a gear mechanism (not shown). Although not shown, the first and second cables 180a, 180b are arranged to extend through the tunnel 178 and out of the second tunnel opening 176 from where they can be connected to the braking mechanism (not shown) and the gear mechanism (not shown) respectively.

The arrangement of the first tunnel opening 174, the second tunnel opening 176 and the tunnel 178 helps to limit the length of the first and the second cables 180a, 180b that are exposed to air travelling over the handlebar 100. As such, the effect of the first and the second cables 180a, 180b on the aerodynamic drag of the handlebar 100 is limited.

Figure 19:
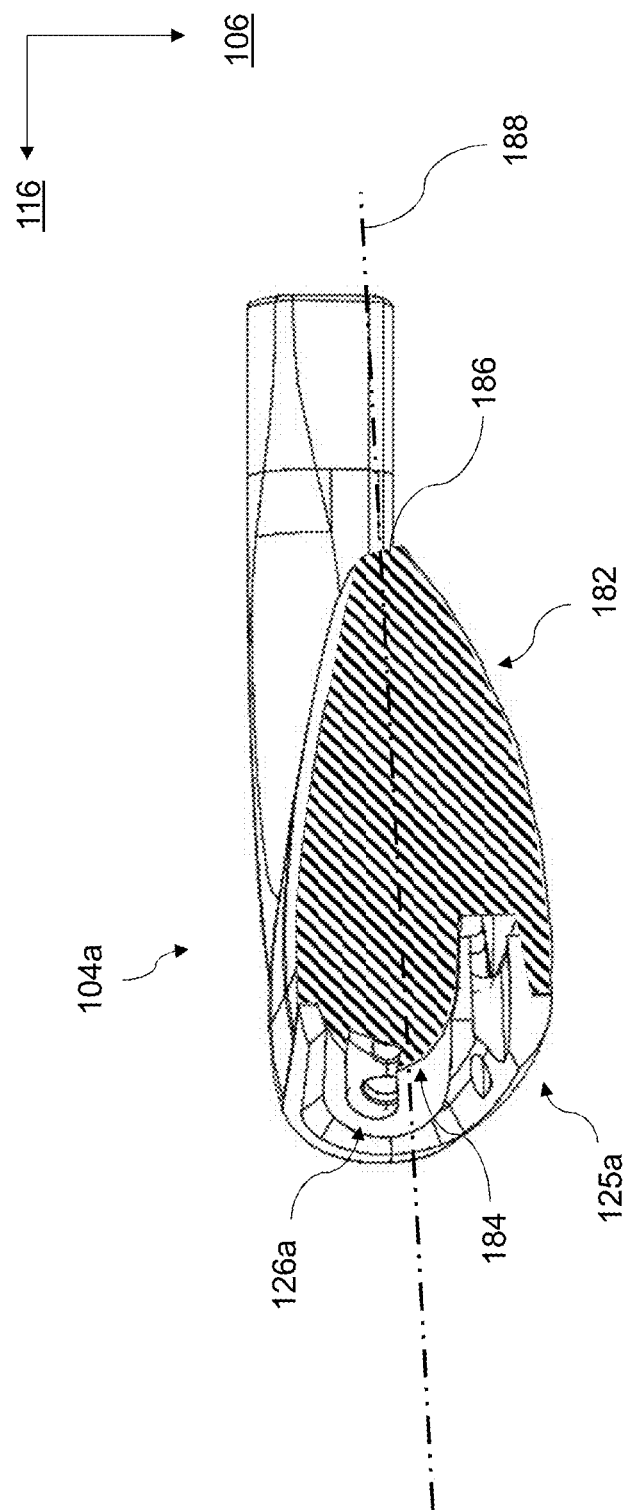
FIG. 19 is a cross-sectional view of the first grippable element along line A-A shown in 25 FIG. 5.

FIG. 19 shows a cross-section through the attachment portion 125a of the first grippable element 104a along the line A-A shown in FIG. 5. Note that the cross-section is represented by hatching to show the external profile of the handlebar 100 more clearly. The cross-section does not show the internal features of the handlebar 100.

Although the plane illustrated in FIG. 19 is not necessarily normal to the first longitudinal axis 114a, it will be appreciated that the attachment portion 125a has a non-circular profile in a plane normal to the first longitudinal axis 114a (which corresponds to a longitudinal axis of the attachment portion 125a).

In the illustrated embodiment, the attachment portion 125a has a substantially aerofoil-shaped profile 182 in a plane parallel to the second axial direction 116. The substantially aerofoil-shaped profile 182 includes a leading edge 184 and a trailing edge 186. It will be appreciated that when an attachment is secured to the first mounting arrangement 126a, such as the attachment 162 in FIGS. 15 to 17 for example, the leading edge 184 will be covered by the attachment. As such, a portion of said attachment will form the leading edge of the substantially aerofoil-shaped profile 182.

It can be seen in FIG. 19 that a linear axis 188 running substantially between the leading edge 184 and the trailing edge 186 is generally aligned with the second axial direction 116. As such, air flowing over the attachment portion 125a and along the opposite second axial direction 116 will flow from the leading edge 184, around the profile 182 and over the trailing edge 186. It will be appreciated that the substantially aerofoil-shaped profile 182 will help to inhibit air travelling around the substantially aerofoil-shaped profile 182 from separating from the attachment portion 125a; i.e. help to inhibit the boundary layer from separating from the attachment portion 125a. As such, the profile drag of the attachment portion 125a will be less relative to if the attachment portion 125a was a bluff body for example.

In the illustrated embodiment, the substantially aerofoil-shaped profile 182 includes a truncated trailing edge 186. However, in alternative embodiments (not shown), the trailing edge 186 may be pointed or rounded.

Advantageously, providing the substantially aerofoil-shaped profile 182 with a truncated trailing edge 186 may improve the comfort of a person gripping that portion of the handlebar 100. Further, truncating the trailing edge 186 may have little or no adverse effect on the drag-reducing properties of the substantially aerofoil-shaped profile 182.

In alternative embodiments (not shown), one or more portions of the first grippable element 104a spaced from or adjacent to the attachment portion 125a may have a substantially aerofoil-shaped profile in a plane parallel to the second axial direction 116.

In alternative embodiments (not shown), the attachment portion 125a may not have a substantially aerofoil-shaped profile in a plane parallel to the second axial direction 116.

Figure 20:
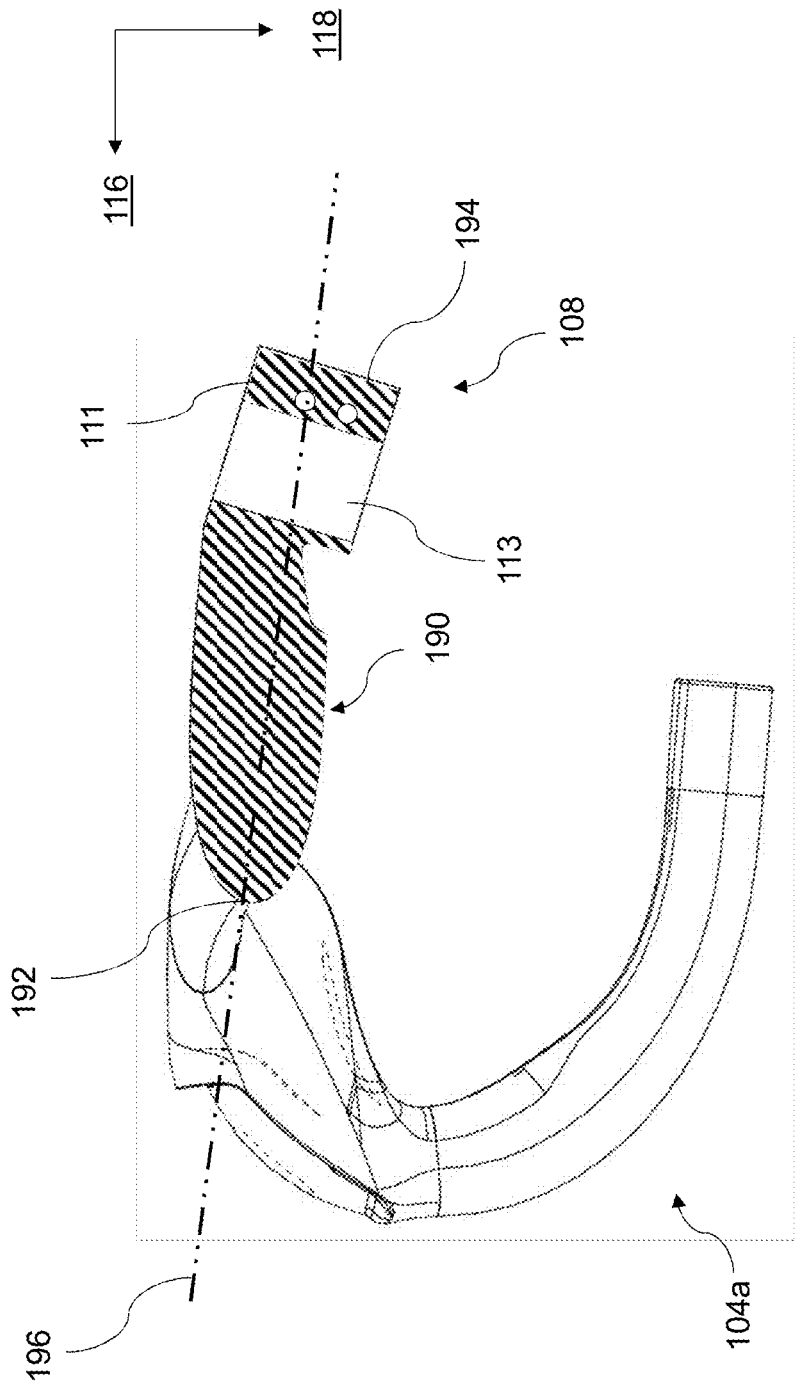
FIG. 20 is a cross-sectional view of the mounting portion along line B-B shown in FIG. 4.

FIG. 20 shows a cross-section through the mounting portion 108 of the transverse support 102 along the line B-B shown in FIG. 4. Note that the cross-section is represented by hatching to show the external profile of the handlebar 100 more clearly.

The cross-section does not show the internal features of the handlebar 100.

In the illustrated embodiment, the mounting portion 108 has a substantially aerofoil-shaped profile 190 in a plane parallel to the second axial direction 116. The substantially aerofoil-shaped profile 190 includes a leading edge 192 and a trailing edge 194.

In the illustrated embodiment, the trailing edge 194 is a truncated trailing edge. However, in alternative embodiments (not shown), the trailing edge 194 may be pointed or rounded.

It can be seen in FIG. 20 that a linear axis 196 running substantially between the leading edge 192 and the trailing edge 194 is generally aligned with the second axial direction 116. As such, air flowing over the mounting portion 108 and along the opposite second axial direction 116 will flow from the leading edge 192, around the profile 190 and over the trailing edge 194.

It will be appreciated that, in use, a member of the frame 214 of the bicycle 212 will extend through the aperture 113, as shown in FIG. 22. As such, air will be inhibited or prevented from travelling through the aperture 113.

Figure 21:
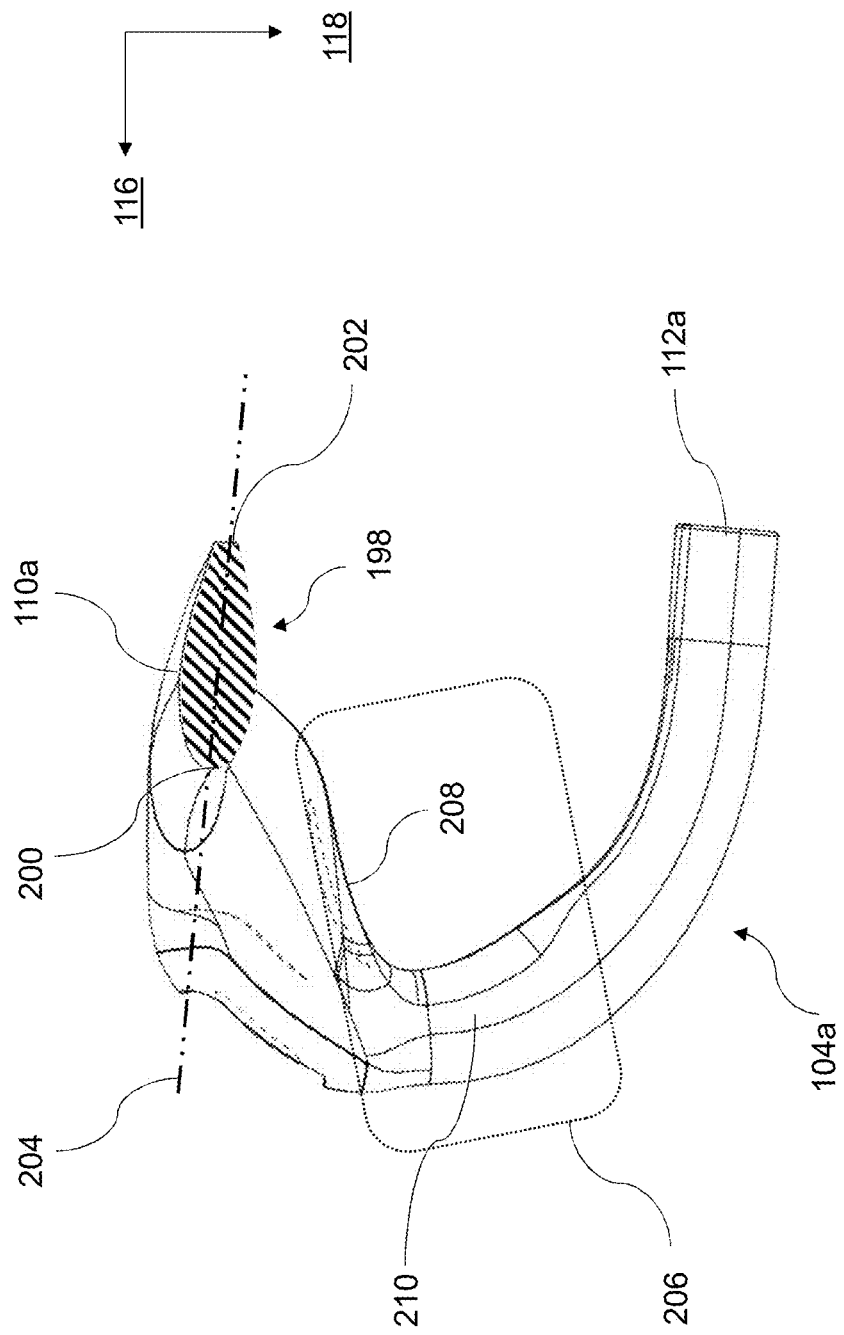
FIG. 21 is a cross-sectional view of the first transverse portion along line C-C shown in FIG. 4.

FIG. 21 shows a cross-section through the first transverse portion 110a of the transverse support 102 along the line C-C shown in FIG. 4. Note that the cross-section is represented by hatching to show the external profile of the handlebar 100 more clearly. The cross-section does not show the internal features of the handlebar 100.

In the illustrated embodiment, the mounting portion 108 has a substantially aerofoil-shaped profile 198 in a plane parallel to the second axial direction 116. The substantially aerofoil-shaped profile 198 includes a leading edge 200 and a trailing edge 202.

In the illustrated embodiment, the trailing edge 202 is a truncated trailing edge. However, in alternative embodiments (not shown), the trailing edge 202 may be pointed or rounded.

It can be seen in FIG. 21 that a linear axis 204 running substantially between the leading edge 200 and the trailing edge 202 is generally aligned with the second axial direction 116. As such, air flowing over the first transverse portion 110a and along the opposite second axial direction 116 will flow from the leading edge 200, around the profile 198 and over the trailing edge 202.

In alternative embodiments (not shown), only the mounting portion 108 or only the first transverse portion 110a has a substantially aerofoil-shaped profile defined in a plane parallel to the second axial direction.

In alternative embodiments (not shown), none of the transverse support 102 has a substantially aerofoil-shaped profile defined in a plane parallel to the second axial direction.

With reference to FIG. 21, the first grippable element 104a includes an ergonomic portion 206. The ergonomic portion 206 is represented as the portion of the first grippable element 104a within the dotted box in FIG. 21. The ergonomic portion 206 is shaped/contoured to correspond to at least a portion of a gripping hand (not shown).

The ergonomic portion 206 includes a wall 208, which is configured to be received within a space formed between the thumb and index finger of a gripping hand (not shown), and to extend towards a user's wrist. The wall 208 may provide support to a user's hand.

An external surface 210 of the ergonomic portion 206 is adjacent to the wall 208. The external surface 210 is contoured to improve the grip between one or more fingers of a gripping hand (not shown) and the external surface 210.

Advantageously, the ergonomic portion 206 may increase the comfort of a user gripping the ergonomic portion 206, as well as increasing the ability of said user to grip the ergonomic portion 206.

The handlebar 100 is substantially symmetric about the plane M illustrated in FIG. 2, which is normal to the first axial direction 106. As such, the second grippable element 104b is substantially a mirror image of the first grippable element 104a about the plane M, and the second transverse portion 110b is substantially a mirror image of the first transverse portion 110a about the plane M. Therefore, the second grippable element 104b and the second transverse portion 110b may include any of the features previously described in relation to the first grippable element 104a and the first transverse portion 110a respectively.

What is claimed is:

1. A handlebar for controlling a travelling direction of a vehicle, the handlebar comprising:
   a transverse support for mounting to a vehicle, the transverse support extending substantially along a first axial direction;
   a first grippable element extending from a first end of the transverse support, the first grippable element including a free end;
   a cavity formed in the transverse support or the first grippable element, the cavity communicating with:
      an opening in an external surface of the transverse support or the first grippable element, and
      a cavity entrance in an external surface of the transverse support or the first grippable element, wherein the cavity entrance is spaced from the opening; and
   a mounting arrangement for mounting an attachment to the handlebar, the mounting arrangement comprising a mounting plate located within the cavity, the mounting plate including:
      a first face which abuts a contact surface within the cavity and is accessible via the opening;
      a second face which is opposite to the first face and is accessible via the cavity entrance; and
      a hole for receiving a fastener for mounting an attachment; and
   a first tunnel opening and a second tunnel opening, wherein the first tunnel opening is adjacent the mounting arrangement, wherein the second tunnel opening is formed in the transverse support and is spaced from the first tunnel opening, wherein the first tunnel opening and the second tunnel opening are in communication with a tunnel for receiving a cable therethrough, the tunnel formed within at least a portion of the transverse support.

2. The handlebar of claim 1, wherein the first face has at least one spatial dimension which is greater than at least one spatial dimension of the opening, such that the mounting plate may be prevented from passing through the opening.

3. The handlebar of claim 2, wherein an area of the first face is greater than an area of the opening.

4. The handlebar of claim 2, wherein the mounting plate is removable from the cavity via the cavity entrance.

5. The handlebar of claim 1, wherein a position of the hole relative to a perimeter of the opening is adjustable in at least one direction.

6. The handlebar of claim 5 wherein the position of the hole relative to the perimeter of the opening is adjustable in two perpendicular directions.

7. The handlebar of claim 1, wherein a portion of the first face is arranged to abut a contact surface of the cavity, wherein the contact surface is adjacent the opening, and wherein the first face and the contact surface have corresponding curved profiles.

8. The handlebar of claim 1, wherein the external surface of the transverse support or the first grippable element comprising the opening has a curved profile.

9. The handlebar of claim 1, wherein the mounting arrangement is located on the first grippable element, and wherein the first tunnel opening is formed in the first grippable element.

10. The handlebar of claim 1, wherein the transverse support comprises a mounting portion for mounting to a vehicle, and wherein the second tunnel opening is formed in or adjacent to the mounting portion.

11. The handlebar of claim 1, further comprising a second grippable element extending from a second end of the transverse support, wherein the second grippable element is substantially a mirror image of the first grippable element about a plane normal to the first axial direction.

12. The handlebar of claim 1 in combination with a bicycle.

13. A handlebar for controlling a travelling direction of a vehicle, the handlebar comprising:
- a transverse support for mounting to a vehicle, the transverse support extending substantially along a first axial direction;
- a first grippable element extending from a first end of the transverse support, the first grippable element including a free end;
- a cavity formed in the transverse support or the first grippable element, the cavity communicating with:
  - an opening in an external surface of the transverse support or the first grippable element, and
  - a cavity entrance in an external surface of the transverse support or the first grippable element, wherein the cavity entrance is spaced from the opening; and
- a mounting arrangement for mounting an attachment to the handlebar, the mounting arrangement comprising a mounting plate located within the cavity, the mounting plate including:
  - a first face which abuts a contact surface within the cavity and is accessible via the opening;
  - a second face which is opposite to the first face and is accessible via the cavity entrance; and
  - a hole for receiving a fastener for mounting an attachment; and
- an attachment secured to the mounting arrangement, wherein the attachment is selected from the group consisting of: a brake mechanism, a gear shift mechanism, a combined brake and gear shift mechanism, a bell, and a cyclocomputer.

14. The handlebar of claim 13, wherein the attachment comprises an attachment mount including a hole, and wherein a fastener passes through the hole in the attachment mount and the hole in the mounting plate such that the attachment is secured to the mounting plate.

15. The handlebar of claim 13, wherein the first face has at least one spatial dimension which is greater than at least one spatial dimension of the opening, such that the mounting plate may be prevented from passing through the opening.

16. The handlebar of claim 15, wherein an area of the first face is greater than an area of the opening.

17. The handlebar of claim 15, wherein the mounting plate is removable from the cavity via the cavity entrance.

18. The handlebar of claim 13, wherein a position of the hole relative to a perimeter of the opening is adjustable in at least one direction.

19. The handlebar of claim 18 wherein the position of the hole relative to the perimeter of the opening is adjustable in two perpendicular directions.

20. The handlebar of claim 13, wherein a portion of the first face is arranged to abut a contact surface of the cavity, wherein the contact surface is adjacent the opening, and wherein the first face and the contact surface have corresponding curved profiles.

21. The handlebar of claim 13, wherein the external surface of the transverse support or the first grippable element comprising the opening has a curved profile.

22. The handlebar of claim 13, wherein a position of the hole relative to a perimeter of the opening is adjustable in at least one direction.

23. The handlebar of claim 22 wherein the position of the hole relative to the perimeter of the opening is adjustable in two perpendicular directions.

24. A handlebar for controlling a travelling direction of a vehicle, the handlebar comprising:
- a transverse support for mounting to a vehicle, the transverse support extending substantially along a first axial direction;
- a first grippable element extending from a first end of the transverse support, the first grippable element including a free end;
- a cavity formed in the transverse support or the first grippable element, the cavity communicating with:
  - an opening in an external surface of the transverse support or the first grippable element, and
  - a cavity entrance in an external surface of the transverse support or the first grippable element, wherein the cavity entrance is spaced from the opening; and
- a mounting arrangement for mounting an attachment to the handlebar, the mounting arrangement comprising a mounting plate located within the cavity, the mounting plate including:
  - a first face which abuts a contact surface within the cavity and is accessible via the opening;
  - a second face which is opposite to the first face and is accessible via the cavity entrance; and
  - a hole for receiving a fastener for mounting an attachment; and
- wherein the mounting arrangement is located on an attachment portion of the first grippable element, wherein the attachment portion has a non-circular profile in a plane normal to a longitudinal axis of the attachment portion.

25. The handlebar of claim 24, wherein the attachment portion has a substantially aerofoil-shaped profile in a plane parallel to a second axial direction, the second axial direction substantially perpendicular to the first axial direction.

26. The handlebar of claim 24, wherein the first face has at least one spatial dimension which is greater than at least one spatial dimension of the opening, such that the mounting plate may be prevented from passing through the opening.

27. The handlebar of claim 26, wherein an area of the first face is greater than an area of the opening.

28. The handlebar of claim 26, wherein the mounting plate is removable from the cavity via the cavity entrance.

29. The handlebar of claim 24, wherein a portion of the first face is arranged to abut a contact surface of the cavity, wherein the contact surface is adjacent the opening, and wherein the first face and the contact surface have corresponding curved profiles.

30. The handlebar of claim 24, wherein the external surface of the transverse support or the first grippable element comprising the opening has a curved profile.

* * * * *